United States Patent
Shah

(10) Patent No.: US 9,912,735 B2
(45) Date of Patent: *Mar. 6, 2018

(54) INTERCEPTING FILE TRANSFERS IN MULTI-NODE TOPOLOGIES

(71) Applicant: Microsoft Technology Licensing, LLC, Redmond, WA (US)

(72) Inventor: Shrey Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

This patent is subject to a terminal disclaimer.

(21) Appl. No.: 14/663,448

(22) Filed: Mar. 19, 2015

(65) Prior Publication Data
US 2015/0195353 A1   Jul. 9, 2015

Related U.S. Application Data

(63) Continuation of application No. 12/684,990, filed on Jan. 11, 2010, now Pat. No. 9,015,330.

(51) Int. Cl.
*G06F 15/16* (2006.01)
*H04L 29/08* (2006.01)
*H04L 29/06* (2006.01)

(52) U.S. Cl.
CPC ............ *H04L 67/10* (2013.01); *H04L 67/141* (2013.01); *H04L 67/288* (2013.01); *H04L 67/42* (2013.01)

(58) Field of Classification Search
CPC .............................. H04L 67/14; H04L 67/141
USPC ........................................................ 709/203
See application file for complete search history.

(56) References Cited

U.S. PATENT DOCUMENTS

| | | | | |
|---|---|---|---|---|
| 2005/0086340 A1* | 4/2005 | Kang | ................ | H04L 29/12113 709/224 |
| 2006/0072550 A1* | 4/2006 | Davis | ..................... | H04L 63/30 370/352 |
| 2007/0016663 A1* | 1/2007 | Weis | ................... | G06F 11/2028 709/223 |
| 2007/0198692 A1* | 8/2007 | Mimura | ................ | G06F 9/5038 709/223 |

* cited by examiner

*Primary Examiner* — Jason Recek

(57) ABSTRACT

A system and method for intercepting and processing a payload sent between clients. A home server determines the roles that are intermediate to the clients by having intermediate servers insert identity information into a message of a session setup protocol. The home server selects a role to be the intercepting role, and sends a notification and aggregate information to a server of the selected role. A server of the intercepting role intercepts and processes the payload when it is sent between the clients. Payload processing may include content inspection or filtering based on any of a number of factors.

20 Claims, 6 Drawing Sheets

INTERCEPTING FILE TRANSFERS IN MULTI-NODE TOPOLOGIES

BACKGROUND

The Session Initiation Protocol (SIP) is an application layer control protocol for creating, modifying, and terminating sessions with one or more participants. The sessions include file transfers, Internet telephone calls, multimedia distribution, and multimedia conferences. SIP may be used to locate a participant, invite a participant to engage in communications, determine media parameters to use, establish a session, and maintain a session. The session itself typically uses another protocol, referred to as a "secondary protocol," to perform the communications. A session can be used for a variety of data transfer applications, including the transfer of a file between participants. Request for Comments (RFC) 3261, available on the Internet (e.g. at address ietf.org/rfc/rfc3261.txt) provides a detailed description of SIP.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to facilitate intercepting and processing a payload sent between clients. A process may include use of a session setup protocol, such as SIP, to set up a communication session in a secondary protocol, the communication session used to transfer a payload from a sending client to a receiving client. Mechanisms in one embodiment enable a home server to determine a set of intermediate server roles, select a server role to be an intercepting server role, notify a server of the intercepting server role, and send aggregated session information to the notified server. The notified server may become an intercepting server, download the payload, perform processing, and forward the payload to the receiving client.

In one embodiment, a server at each intermediate role on a path between clients receives at least one session setup message sent between the clients in a session setup protocol and inserts, in the message, identifying information indicating an identity of the intermediate server role. A home server may receive the identifying information from one or more server roles, determine an intercept server role based on a policy and the identifying information, and send an identification of the intercept server role in a subsequent notification message. In response, a server of the intercept server role may perform actions of the intercept server.

Intercept actions may include establishing a first connection with the sending client, a second connection with the receiving client, downloading the payload in the first connection, processing the payload, and forwarding the payload in the second connection.

In one embodiment, processing the payload includes content inspection of the payload. This may include scanning the payload for malware, sensitive information, or other data. In one embodiment, processing the payload includes filtering based on one or more factors, such as file type, file name, client characteristics, or other factors.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
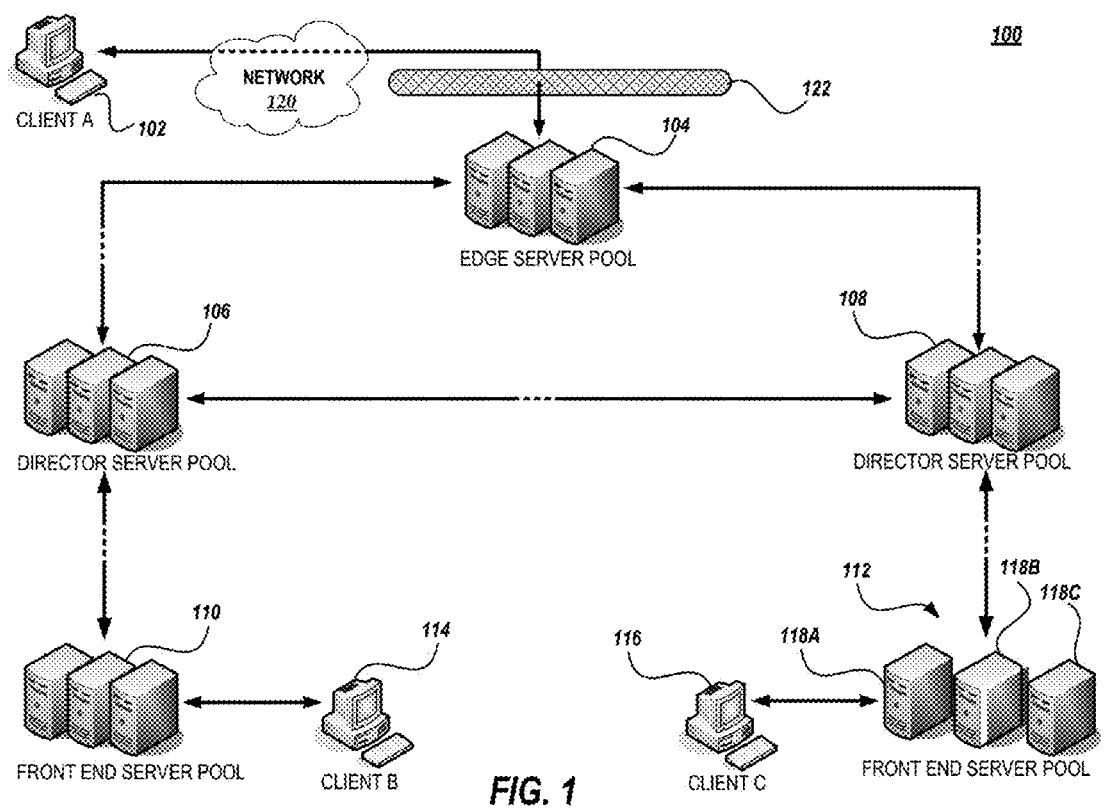
FIG. 1 is a block diagram illustrating an example embodiment of an environment in which mechanisms described herein may be practiced.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

As used herein, the term "application" refers to a computer program or a portion thereof, and may include associated data. An application may be an independent program, or it may be designed to provide one or more features to another application. An "add-in" and a "plug-in" are examples of applications that interact with and provides features to a "host" application.

An application is made up of any combination of application components, which may include program instructions, data, text, object code, images or other media, security certificates, scripts, or other software components that may be installed on a computing device to enable the device to perform desired functions. Application components may exist in the form of files, libraries, pages, binary blocks, or streams of data.

As used herein, the term "malware" refers to software designed to infiltrate a computer system without the owner's informed consent. It includes computer viruses, worms, Trojan horses, spyware, or other malicious software.

As used herein, the term "server role," or simply "role" as applied to a pool of one or more servers, describes a functional grouping of one or more servers such that the servers of a common role perform a function and any server in a common role may be called upon to perform the function. Examples of server roles include a front-end role, a director role, and an edge role. A front end server role may coordinate communications and authenticate users. It may also aggregate session data as described herein. In one embodiment, an edge server role allows external users to communicate with internal users. It may be deployed in a network perimeter, between an internal and an external facing firewall. A director role may serve to perform user authentication actions for internal or external users. As used herein, reference to a role that performs an action means that at least one server of the role performs the action.

FIG. 1 is a block diagram illustrating an example embodiment of an environment 100 in which mechanisms described herein may be practiced. Environment 100 is only one example of a suitable environment and is not intended to suggest any limitation as to the scope of use or functionality of the present invention. Environment 100 is an example configuration that may be deployed with Office Communication Server (OCS), by Microsoft Corp. OCS provides software and an architecture that enables instant messaging, file transfer, voice and video communication capabilities. The mechanisms described herein may be used with any of these types of data transfer.

As illustrated, example environment 100 includes three example clients, three example server roles, and five example server pools. The three illustrated roles are edge, director, and front-end. As shown, edge server pool 104 communicates with director server pool 106, which communicates with front-end server pool 110. Edge server pool 104 also communicates with director server pool 108, which communicates with front-end server pool 112. A server pool may include one or more servers. Front end server pool 112 includes servers 118A-C. Each of the illustrated server roles is inside an external-facing firewall 122.

Client A 102 communicates with edge server pool 104 over a network 120 and through external-facing firewall 122. Network 120 may be a wide area network, such as the Internet. Network 120 may include any combination of communication mechanisms, including wired or wireless medium. It may employ any of a variety of network communication protocols.

Client B 114 communicates with front-end server pool 110, and client C 116 communicates with front-end server pool 112. As illustrated, client A 102 may communicate with client B 114 using servers of edge server pool 104, director server pool 106, and front-end server pool 110 as intermediate network devices. Client A 102 may communicate with client C 116 using servers of edge server pool 104, director server pool 108, and front-end server pool 112 as intermediate network devices. Client B 114 may communicate with client C 116 using servers of front-end server pool 110, director server pool 106, director server pool 108, and front-end server pool 112. Client B 114 may communicate with client C 116 using front-end server pool 110, director server pool 106, director server pool 108, and front-end server pool 112. Thus, client B and client C may communicate with each other without using edge server pool 104 and without passing through external-facing firewall 122.

A communication that uses an intermediate server pool may use one or more servers of the pool. For example, client C 116 may send a message that passes through server 118A and is then routed directly to director server pool 108. Alternatively, client C 116 may send a message that passes through server 118A, then server 118B, and is then routed to director server pool 108.

In one embodiment, a session setup protocol is used to establish a session between two clients. A secondary protocol, other than the session setup protocol, is then used to perform a communication within the session. The session setup protocol and the secondary protocol may be used to perform any of a variety of data transfer applications, such as the transfer of a file between two clients. The content that is transferred in the secondary protocol is referred to as the "payload" of the communication, or the payload of the messages within the communication.

In one embodiment, the Session Initiation Protocol (SIP) is used as the session setup protocol. Though RFC 3261 describes a version of SIP, the mechanisms described herein may be performed with other versions of SIP, variations thereof, or other session setup protocols. The use of SIP in discussions herein is to be considered an example of a session setup protocol.

SIP provides that each client has an affinity with a corresponding server, referred to as the client's "home" server. In one embodiment, the home server may maintain the current status of the client and may include a mechanism to authenticate the client. The home server for each client having a communication with another client may differ from the other client's home server, or they may share a home server. In one embodiment, protocol logic includes a mechanism for determining a client's home server. In one embodiment, the front-end server that receives a client's initial SIP message before any other front-end server becomes the client's home server. In example environment 100, if front-end server 118A is the topologically closest front-end server to receive a SIP message from client C 116 when establishing a session, it becomes this client's home server. If front-end server 118B is the topologically closest front-end server to receive a SIP message from client A 102 when establishing a session, it becomes this client's home server. SIP is considered to be a stateless protocol, in that each intermediate server other than the home server performs actions as a routing agent, but does not maintain state of the clients or the session between messages.

A client device may be any computing device, including a personal computer, handheld computer, cellular or satellite communication device, smart phone, server, mainframe, or other computing device having one or more processors. Each client device may have one or more instances of a client operating concurrently, each instance having a corresponding communication with an instance of another client. Each instance may have affinity with its corresponding home server, which may be different for different instances of a client. As used herein, the term "client" refers to an instance of a client, unless the context clearly indicates otherwise.

A home server may retain state information pertaining to its client and the SIP communication in which it is participating. The state information may include such data as the client's IP address and port, one or more encryption keys, a flag indicating whether to enforce a secure connection, a type of encryption, a protocol specification, or the like. The home server may receive and aggregate this information from one or more session setup messages.

In one embodiment, servers other than the home server, and particularly servers in roles other than the role of the home server, may operate as routers in that they receive messages from one client and forward them to another, but they do not retain state information descriptive of the communication. They are thus considered to be stateless with respect to the SIP communication.

Because the home server retains state information, it has information to perform data transfer in the secondary protocol. For example, after completion of a SIP communication to establish a session, a home server may establish a first TCP connection with its client and a second TCP connection with the other client. It may download a file or block of data from its client within the first TCP connection, and resend the file or data to the other client within the second TCP connection. In some configurations, the home server may perform operations on the payload that it receives and resends. For example, it may perform a scan of the payload to detect malware, sensitive information, or for other data. If the payload is encrypted, it may use the encryption key and data that it has to decrypt the payload. In another example, the home server may store the payload, or a portion thereof. A number of other operations on the payload may be performed.

Described herein are mechanisms to enable a role other than the home server's role to perform at least some of the operations of a home server, such as scanning, storing, or otherwise processing the payload of the secondary protocol.

Figure 2:
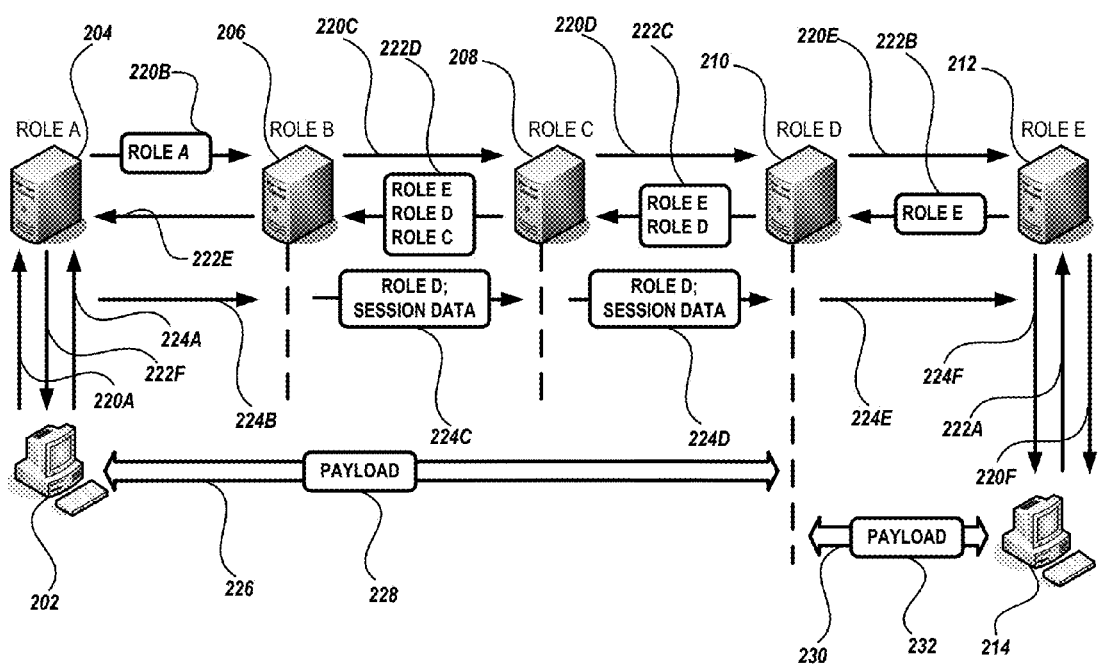
FIG. 2 illustrates an example system and shows example messages that may be used to implement at least some of the mechanisms described herein.

FIG. 2 illustrates an example system 200 and shows example messages that may be used to implement at least some of the mechanisms described herein. System 200 includes sending client 202 and receiving client 214. The example illustrates messages that may be used as part of a process of transmitting a file or block of data from sending client 202 to receiving client 214. In one embodiment, example system 200 may be integrated with an instant message system, and a file transfer may take place within, or be initiated by, an instant message communication.

System 200 includes a number of roles. Each role may comprise one or more server pools, such as edge server pool 104, director server pool 106, or front-end server pool 110 of FIG. 1. Each server pool is referred to as a "role" in FIG. 2 to show the functionality of the server pool, and to generalize each server role. Thus, server role A 204, server role B 206, server role C 208, server role D 210, and server role E 212 each represent a role with a pool of one or more servers, ordered from sending client 202 to receiving client 214. Each server role is a routing hop between the clients. There may be more or less server roles in various configurations, and more or less routing hops between the clients.

For illustrative purposes, a server within role B 206 is designated as the home server. As described herein, in one implementation of SIP, the front-end server closest to the sending client is designated as the home server. However, the mechanisms described herein are not so limited. Thus, role B 206 is used in this example as the home server to show the flexibility of the mechanisms, which may be used in a configuration with zero, one, or more roles or hops between the sending client 202 and the home server.

System 200 illustrates three SIP messages that may be used to set up a session. This includes messages 220, 222, and 224. In an implementation of SIP, message 220 may be sent from sending client 202 to receiving client 214. In response, message 222 may be sent from receiving client 214 to sending client 202. In response to message 222, message 224 may be sent from sending client 202 to receiving client 214. Message 220 is shown divided into message hops 220A-F, where the hops occur in alphabetical order. Similarly, message 222 is divided into ordered message hops 222A-F and message 224 is divided into ordered message hops 224A-F. In one implementation, message 220 is a SIP INVITE message, message 222 is a SIP ACCEPT message, and message 224 is a SIP ACCEPT message.

A described herein, after a SIP transaction sets up a session, a role is selected to be an "intercepting role," and a server within the intercepting role becomes an "intercepting server." A server of role D 210 is shown to be an intercepting server in example system 200. Actions of an intercepting server are discussed in detail herein. Briefly, in one embodiment, an intercepting server may set up a first TCP connection 226 with sending client 202 and a second TCP connection 230 with receiving client 214. A file or block of data is downloaded from the sending client to the intercepting server in the payload 228 of the first TCP connection 226, processed, and then forwarded in the payload 232 of the second TCP connection 230. In one embodiment, a file may be downloaded to the intercepting server using the File Transfer Protocol (FTP). The file may be sent to the receiving client using FTP. Mechanisms described herein enable the performance of these actions by the intercepting server.

Figure 3:
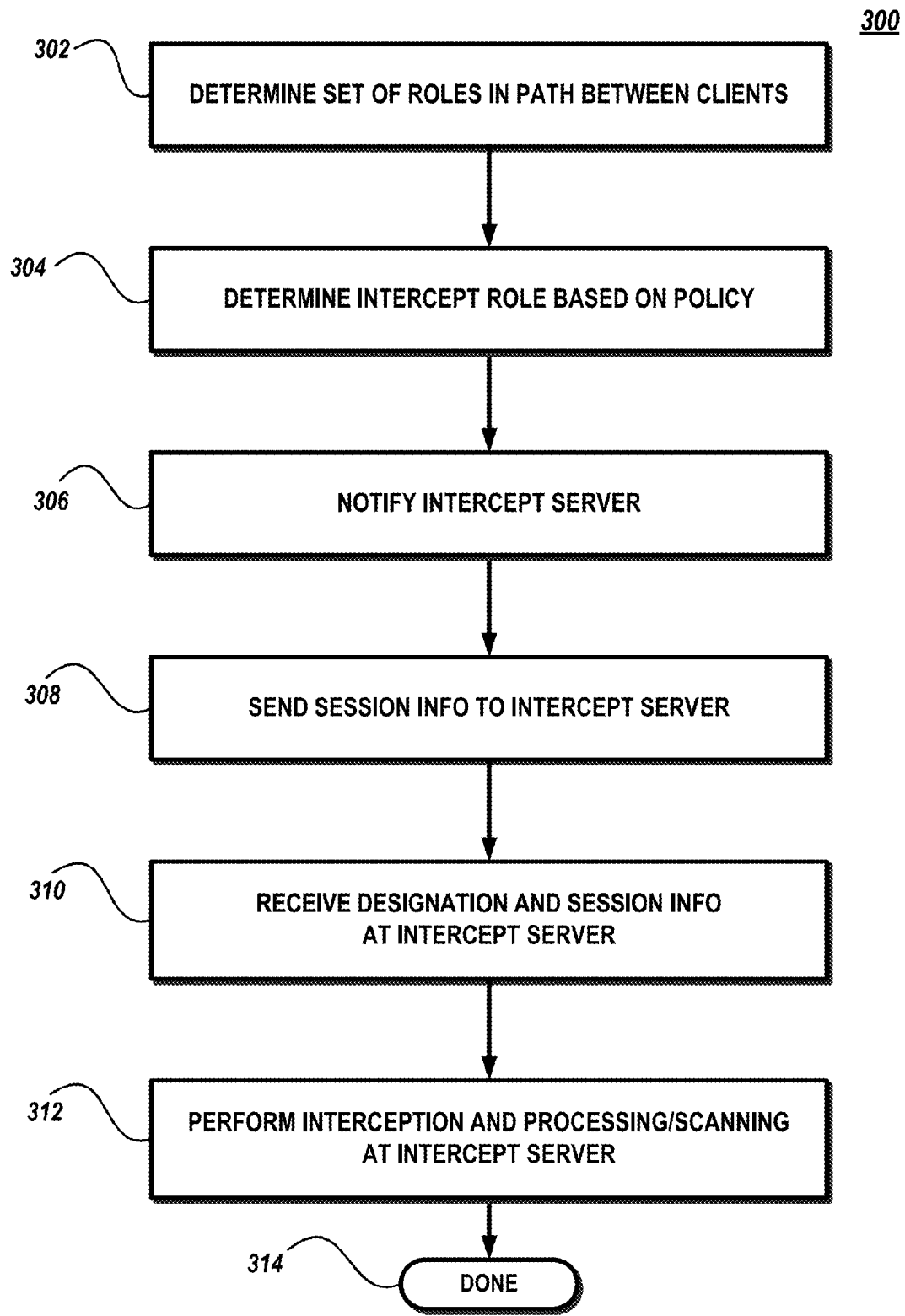
FIG. 3 is a flow diagram illustrating an example embodiment of a process for scanning payloads of a data transfer between two clients.

FIG. 3 is a flow diagram illustrating an example embodiment of a process 300 for scanning payloads of a data transfer between two clients. Process 300 may be performed within environment 100 or a variation thereof. It may be performed with a data transfer between any two of client A 102, client B 114, or client C 116, in either direction. For illustration, references are made to system 200 of FIG. 2, with sending client 202 and receiving client 214. Process 300 may be performed in a system in which a first transaction conforming to a session setup protocol performs actions to set up a session between two clients, and one or more other transactions conforming to a secondary protocol performs actions to transfer data between the two clients. In one embodiment, SIP is the session setup protocol, and some of the discussion herein uses SIP as an example of a session setup protocol, though the mechanisms may be employed with any of a number of protocols that may be used to set up a session between clients.

Figure 4:
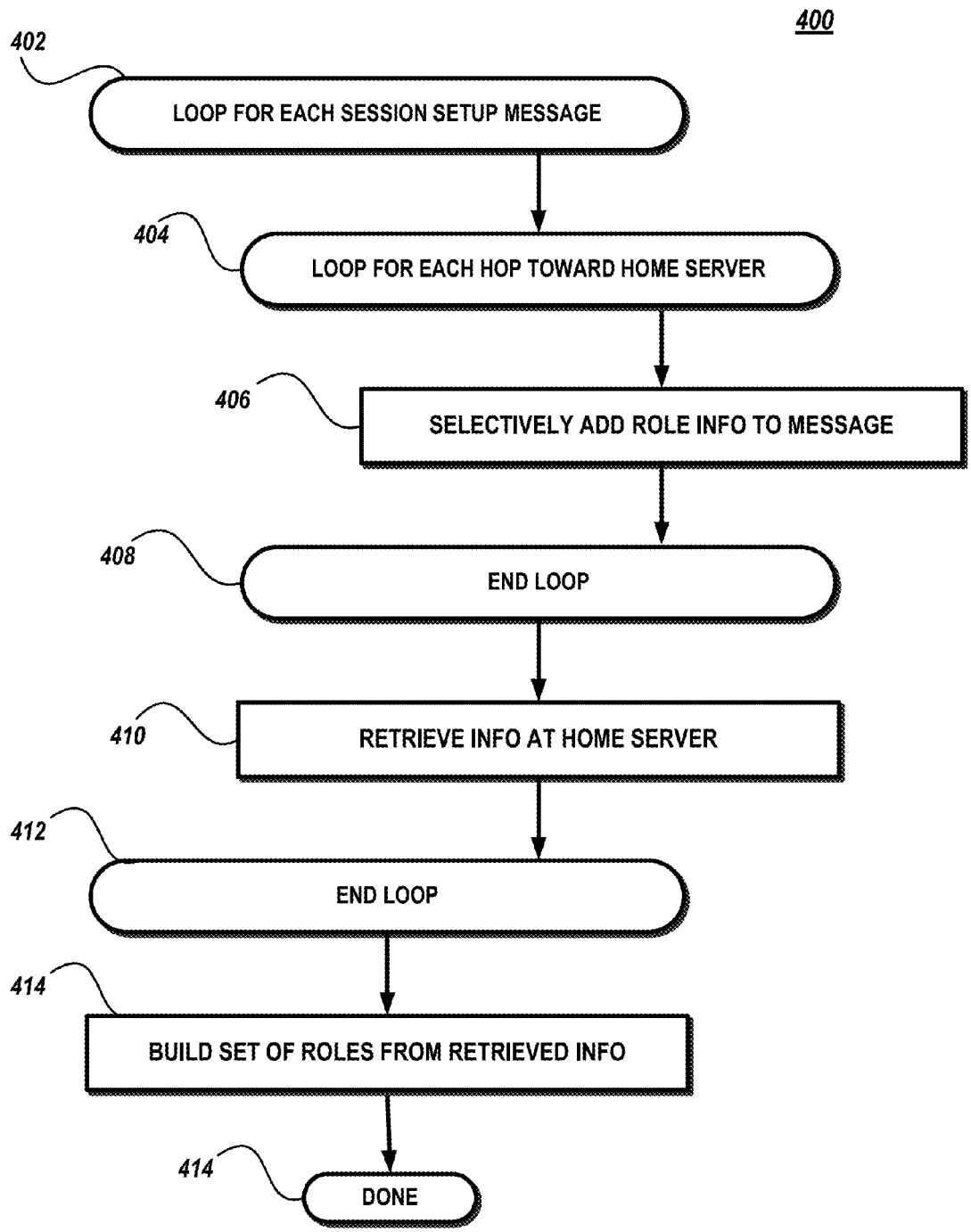
FIG. 4 is a flow diagram illustrating an example process for determining a set of roles in a path between two clients.

The illustrated portions of process 300 may begin at block 302, where a set of roles in a path between the clients is determined. In some embodiments, the set of roles may be a subset of the actual roles, the subset including the roles that opt in to be included in the determined set so that they may be considered for designation as an intercepting role. Thus, the set of roles as used herein does not suggest that the set is complete. FIGS. 2 and 4 and related discussion illustrate a process for determining a set of roles. Briefly, an embodiment of this process includes having a server of each role add information to a message sent between the clients, the information indicating that the role exists on the path. The home server may then receive and aggregate this information to determine the set of roles.

The process may flow to block 304, where a server role to intercept and scan the payload may be determined, based on a policy. A system implementing the actions of block 304 may be configured with any of a number of policies. Some examples of policies are now described. In each of these policies, the candidate roles are roles in the path between clients that have opted in to be a candidate intercepting role.

One policy is to select an intercepting role based on its proximity to the sending client or to the receiving client. For example, a policy may select the role that is topologically closest to the sending client.

One policy is to select an intercepting role based on the load of each role, such that the least heavily loaded role is selected. In such a policy, each role may include information in a message of the SIP protocol to indicate its load. This may be in terms of CPU utilization, memory usage, process usage, number of concurrent transactions, other load statistics, or a combination thereof. In one embodiment, a role may choose to not opt in as a candidate role if its load exceeds a configured amount.

One policy is to select an intercepting role based on the capabilities of each role. Example of capabilities include whether the server role can perform virus scanning or other malware scanning, the type of malware scanning that the intercepting role performs, the type of filtering the intercepting role performs, or any other intercepting capability. In such a policy, each role may include information in a message of the SIP protocol to indicate its capabilities.

One policy is to select an intercepting role based on a configured role or a configured order of roles. Thus, if multiple roles are configured in an order, the first-ordered role may be selected if it is available; if not, the selection policy proceeds down the ordered list until an available role is found.

One policy is to randomly select from the available roles, in order to balance the load among the roles.

A policy may be formed of any combination of policies described herein, or other policies. For example, a policy may select the two least loaded roles and then randomly select one of them. In another example, a policy may select a configured first choice role unless the first choice role is above a threshold load.

Process 300 may flow to block 306, where the selected intercept role is notified. In one embodiment, this action may include adding information to a SIP message following the SIP messages that were used to determine the set of roles. For example, in a SIP transaction that uses three messages, one embodiment may use the first two messages to pass information for determining the set of roles. A home server may then include information in the third message that indicates the selected intercept role. In the example message flow of FIG. 2, message 224C-D includes the designation of role D as the intercept role. In some configurations, the home server may initiate an additional message to notify the selected intercept role that it has been selected. Message 224, or another message that is used to notify the selected intercept role, is referred to as the "notification" message herein, though it may serve other purposes within the session setup protocol.

In one embodiment, the intercepting server may replace the sending client's IP address in one or more of the SIP messages, such as message 224, with its own IP address. In an implementation in which the receiving client uses the IP address from this SIP message to download the payload, changing the IP address will cause the receiving client to connect with the intercepting server instead of with the sending client. In one embodiment, the receiving client uses FTP to download the payload from the intercepting server.

The process may flow to block 308, where aggregated session information may be sent to the selected intercept server. This may include the information pertaining to the sending client, the receiving client, or the session to be used to carry the payload, or a portion thereof. As described herein, this aggregated session information may include one or more of the sending client IP address or port, the receiving client IP address or port, one or more encryption keys, a flag indicating whether to enforce a secure connection, a type of encryption, a protocol specification, or the like. In one embodiment, the aggregated session information may be sent in the same message as the designation of the intercept role. In one implementation, the aggregated information is serialized into an aggregate information string prior to insertion in the message. It may then be restored by the receiving intercepting server. FIG. 2 illustrates an example in which the home server, in role B 206, adds this information to message 224C.

The process may flow to block 310, where a server of the selected intercept server role receives the designation and the session information. As discussed, this may arrive in a single message or in multiple messages. In one embodiment, the server at the selected intercept server role that receives the message becomes the intercept server. In one embodiment, the server that receives the message may forward the information to another server to perform the actions of the intercept server.

The process may flow to block 312, where the intercept server intercepts the payload and performs actions to scan, filter, or otherwise process the payload. Example details of the actions of block 312 are provided in FIG. 5. Briefly, in one embodiment, the intercept server may initiate a TCP session with each of the sending client and the receiving client, download the payload from the sending client in one TCP session, scan the payload, and forward the payload to the receiving client in the second TCP session. As discussed herein, in one implementation, the receiving client may receive the intercepting server's IP address in a SIP ACCEPT message and subsequently download the payload from the intercepting server using FTP. This is illustrated in FIG. 2, with TCP connection 226 between the sending client 202 and the intercept server carrying payload 228, and TCP session 230 between the intercept server and the receiving client 214 carrying payload 232. The process may flow to done block 314, where it may exit or return to a calling program.

FIG. 4 is a flow diagram illustrating an example process 400 for determining a set of roles in a path between two clients, such as sending client 202 and receiving client 214. Process 400, or a variation thereof, may implement at least a portion of the actions of block 302 of FIG. 3.

The illustrated portions of process 400 may begin at loop 402, which iterates over one or more messages of SIP, or another protocol for setting up a session to transfer data. Loop 402 includes blocks 404-412. In one embodiment, the first iteration of loop 402 may perform actions on message 220, which is sent from sending client 202 to receiving client 214. The process may flow to loop 404, which is nested within loop 402. Loop 404 may iterate for each hop of the current message, though in some implementations, it may iterate over a subset of the hops. More specifically, it may iterate for each hop in the direction of the home server. For example, in the example environment of FIG. 2, loop 404 may iterate once for the hop represented by message 220B, which is the hop between role A 204 and role B 206, role B being the home server in this example. Loop 404 includes blocks 406-408.

Process 400 may flow to block 406, where a server in the role at the message hop may selectively add information indicating the identification of the role. In the example of FIG. 2, the server of role A 204 adds information indicating "ROLE A" to message 220B. This information may be encoded in a variety of ways, though the string "ROLE A" is used to illustrate what the information represents. In one implementation, the identifying information is included in a header of a SIP message. A "stamp" header is a SIP header that may be used to carry information between instances of an application executing on respective servers in a configuration such as environment 100 or system 200. The stamp header is removed from the SIP message prior to forwarding to the sending or receiving client. One implementation inserts the role identification information in a stamp header of a SIP message, though various implementations may use other headers or the body of a message. The information may be in the form of tokens, strings, identifiers, or another format.

Adding the identification information at block 406 is a way of opting in to be a candidate for the intercepting server. In various embodiments, a server may unconditionally opt in or may selectively opt in based on one or more factors. In one embodiment, a role may be configured to not opt in as a candidate. In one embodiment, a role may selectively opt in based on a load of the role's servers. Load may be determined based on one or more of CPU usage, memory usage, number of processes, concurrent transactions, or another measurement. In one embodiment, a role may be configured to opt in if a role upstream from it in the current message has not opted in, and to opt in if no upstream role has already opted in. This can be determined by examining the identification information already added to the current message.

In one embodiment, a role may selectively opt in based on whether the sending client is local or remote. For example, a role may opt in if the sending client is local. Other factors may include whether a session will be encrypted, a type of encryption, a protocol to be used for the session, or any other configured factor.

The process may flow to block 408, which terminates loop 404. In some configurations, the process may loop back to loop 404 and perform another iteration of loop 404. However, in process 400, loop 404 may perform one iteration with the example message 220. This is because the remaining hops of message 220 are not in a direction toward the home server. Thus, the process may flow from block 408 to block 410 after one iteration of loop 402.

At block 410, the home server may retrieve the information added by one or more servers at block 406. In the example system 200, the home server in role B retrieves the information added by the server of role A 204. This provides a set of roles between the sending client and the home server.

The process may flow to block 412, which terminates loop 402. From block 412, the process may loop back to loop 402, and perform another iteration for message 222, which is sent from the receiving client 214. The process flows to inner loop 404. The first iteration of the inner loop 404 for message 222 is for the hop of message 222B. For this hop, the server of role E 212 adds the information representing "ROLE E" to the message. The process flows to block 408 and loops back to inner loop 404, performing another iteration for the hop of message 222C. For this hop, the server of role D 210 adds the information "ROLE D" to the message. The process again flows to block 408 and loops back to inner loop 404, performing another iteration for the hop of message 222D. For this hop, the server of role C 208 adds the information "ROLE C" to the message. The process flows to block 408. At this point, the process may exit the inner loop because there are no more hops toward the home server.

The process may flow to block 410, where the home server may retrieve the information added to message 222. In this example, this information indicates the roles "ROLE E," "ROLE D," and ROLE C."

The process may flow to block 412. In this example, process 400 may exit loop 402 because after one message in each direction, the home server has the information representing the roles between the sending client and the receiving client. The process may flow to block 412, where the home server may build the set of roles from the retrieved info. This action may include concatenating the information that it received, or combining it in another manner. For example, it may order the set based on topology, load, configured preferences, or another factor.

The process may flow to done block 414, and exit or return to a calling program, such as process 300.

Figure 5:
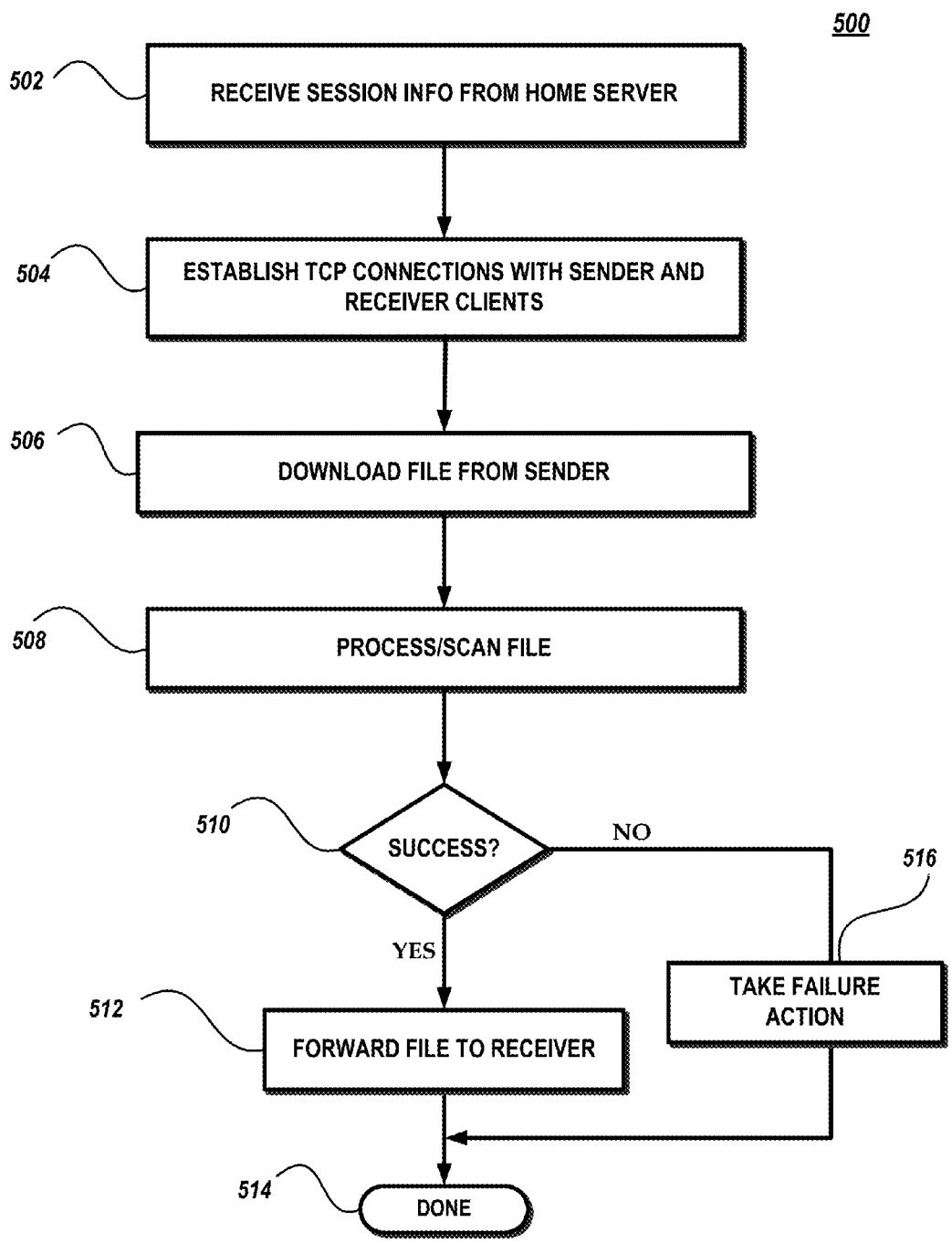
FIG. 5 is a flow diagram illustrating a process of intercepting and processing a payload by a designated intercepting server.

FIG. 5 is a flow diagram illustrating a process 500 of intercepting and processing a payload by a designated intercepting server, such as a server of role D 210 in FIG. 2. Process 500 may implement at least a portion of the actions of block 312 of FIG. 3. In some embodiments in which a designated intercepting role includes multiple servers in a pool, any server in the pool may process each of the session setup messages, and the same or different servers may handle successive messages. In one embodiment, a single server is designated as the intercepting server, though it may perform its actions in conjunction with other servers. The intercepting server may be the server that receives the setup message notifying the role of its designation, though in some embodiments, this server may designate another server of its role to be the intercepting server. Though the discussion herein refers to a single intercepting server, in various embodiments, the actions of an intercepting server may be distributed among multiple servers.

The illustrated actions of FIG. 5 may begin at block 502, where an intercepting server receives aggregated session information from the home server. As discussed herein, this information may be received in a header of a session setup message, such as message 224 of FIG. 2, or a separate message.

The process may flow to block 504, where an intercepting server may establish connections with each of the sending client and the receiving client. In one embodiment, each of these connections may be a TCP connection, though various embodiments may employ other protocols. Some embodiments may employ a protocol layered above a TCP connection, such as a Secure Sockets Layer (SSL) or Transport Layer Security (TLS) protocol, to provide security.

FIG. 2 illustrates a first TCP connection 226 with sending client 202 and a second TCP connection 230 with receiving client 214. Though this example shows connections with client servers, in some configurations a client may employ one or more servers to facilitate payload transmission or receipt, and the connections established by an intercepting server may be with these servers rather than directly with a client at either end. For example, a home server or another server may perform encryption or decryption for a client, and the intercepting server's connection may be with the encryption/decryption server. Some embodiments may include multiple intercepting servers, and each intercepting server may establish a TCP connection with a client or another intercepting server.

Process 500 may flow to block 506, where a file or block of data may be downloaded from the sending client to the intercepting server. The process may flow to block 508, where the downloaded data may be processed. Processing the downloaded data may include one or more of a number of actions. It may include scanning the data for malware, sensitive data, keywords, or other information. This scanning is referred to as "content inspection." Processing may include filtering files based on file name, file extension, file size, file type, or other file metadata. Content inspection or file filter settings may be based on whether the sender is internal or external, the domain of the sender, the identity of the sender or receiver, or other factors. In one embodiment, processing may include storing at least a portion of the data, forwarding at least a portion of the data to another server for additional processing, maintaining accounting information, or other actions. In one embodiment, processing may include modifying the data in some manner, such as deleting, modifying, or adding information.

The process may flow to decision block 510, where a determination may be made as to whether the processing actions at block 508 were successful, based on configured logic. In some embodiments, detection of target content may be determined to be a failure, though in some embodiments, scanning may be considered to be a success even if target content is found. If, at decision block 510, the processing of block 508 is considered to be a success, the process may flow to block 512, where the file or data block may be forwarded to the receiving client. As illustrated in FIG. 2, this may include inserting the data in the payload of a TCP connection with the receiving client. The process may flow to done block 514, where the process may exit or return to a calling program.

If, at decision block 510, it is determined that the processing of block 508 is not successful, the process may flow to block 516, where one or more failure actions are taken. Failure actions may include one or more of terminating one or both TCP connections, sending an error notification to the sending client or receiving client, notifying another server, recording information describing the failure, or other actions. The process may flow to done block 514, and exit or return to a calling program.

It is to be noted that, although actions of process 500 are illustrated as separate blocks, at least some of these actions may be performed concurrently or iteratively. For example, a portion of a file may be downloaded, processed and forwarded prior to, or concurrently with, downloading, processing, and forwarding another portion of the file.

In some embodiments, more than one role may perform functions of an intercepting role. In such embodiments, the processes describe herein may include determining multiple intercepting roles, notifying each intercepting role of the selection, and sending each intercepting role the aggregated session data or a portion thereof. A server of each intercepting role may perform actions such as process 500. For example, a first intercepting server may perform content scanning on the payload, and a second intercepting server may perform additional content scanning or record at least a portion of the payload. Various other combinations of actions may be performed by multiple intercepting servers. In an embodiment with multiple intercepting servers, each intercepting server may form a TCP connection with another intercepting server, rather than with the sending or receiving client.

In one embodiment, a set of token values and corresponding data may be used in the stamp header field to pass information among servers, as described herein. Table 1 includes a set of token values and corresponding data that is used in an example implementation. This implementation may be employed in an environment similar to environment 100 of FIG. 1, having an edge role, a director role, and a front-end role. This implementation may be used with a policy in which the first role that opts in to be a candidate intercept server becomes the intercept server, and subsequent servers that receive the SIP message with a stamp token do not add their identification to the stamp. For example, if the stamp header contains "TaggedByAccessEdge," the director role will not modify this header. The "Use" field of Table 1 briefly describes the meaning of each token.

TABLE 1

Stamp Values

| Stamp Value | Data Description | Use |
| --- | --- | --- |
| Null | null | Default value. Indicates that the message has not yet been seen nor processed by any server. |
| ScanComplete | null | Indicates that no other server should process the SIP request. |
| TaggedByAccessEdge | null | Indicates that an AccessEdge server role has seen the message, but has not processed its contents. |
| TaggedByDirector | null | Indicates that a Director server role has seen the message, but has not processed its contents. |
| TaggedByFrontEnd | File transfer request information | Indicates that a Front-End server role has seen the message, but has not processed its contents. |
| RequiredByAccessEdge | Aggregated file transfer information | Indicates that an Edge server role is the selected intercept server role. |
| RequiredByDirector | Aggregated file transfer information | Indicates that a Director server role is the selected intercept server role. |

The example stamp tokens of Table 1 also provide a mechanism to notify a server of the intercept role that it has been selected to be the intercept server. For example, the token "RequiredByDirector" indicates that the director role has been selected to be the intercept role. When a director server sees this stamp header, it knows that it is the intercept server and performs the actions described herein.

Figure 6:
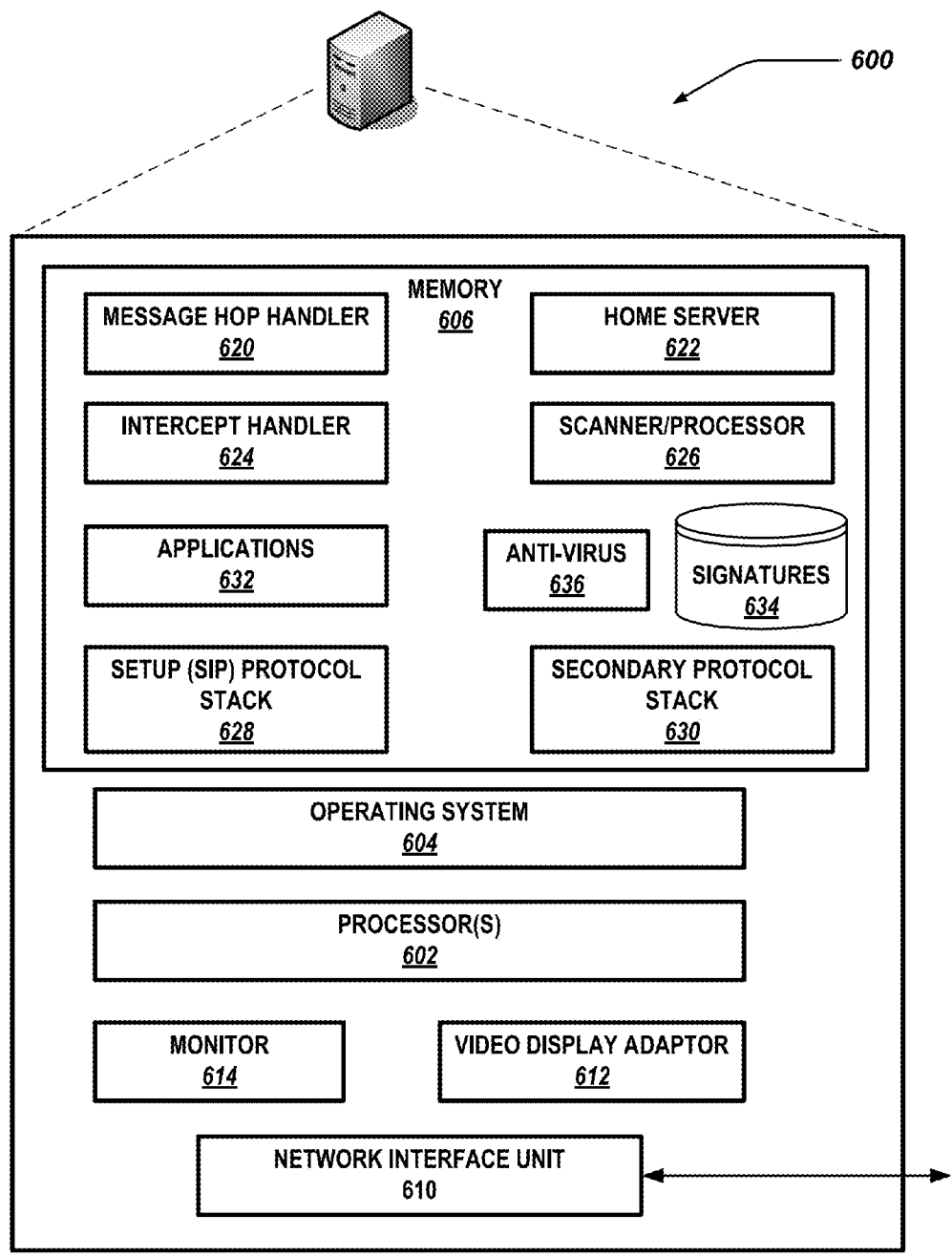
FIG. 6 shows one embodiment of a computing device, illustrating selected components of a computing device that may be used to perform functions described herein.

FIG. 6 shows one embodiment of a computing device 600, illustrating selected components of a computing device that may be used to perform functions described herein and attributed to a server of environment 100 or system 200. Computing device 600 may include many more components than those shown, or may include less than all of those illustrated. Computing device 600 may be a standalone computing device or part of an integrated system, such as a blade in a chassis with one or more blades.

As illustrated, computing device 600 includes one or more processors 602, which perform actions to execute instructions of various computer programs. In one configuration, each processor 602 may include one or more central processing units, one or more processor cores, one or more ASICs, cache memory, or other hardware processing components and related program logic. As illustrated, computing device 600 includes an operating system 604. Operating system 604 may be a general purpose or special purpose operating system. The Windows® family of operating systems, by Microsoft Corporation, of Redmond, Wash., are examples of operating systems that may execute on computing device 600.

Memory 606 may include one or more of a variety of types of non-transitory computer storage media, including volatile or non-volatile memory, RAM, ROM, solid-state memory, disk drives, optical storage, or any other medium that can be used to store digital information. In one configuration, memory 606 may store message hop handler 620 which includes instructions to perform at least some of the actions of each server when handling session setup messages. Memory 606 may store home server 622, which includes instructions to perform at least some of the actions of a home server as described herein. Memory 606 may store intercept handler 624, which performs at least some of the actions of intercepting and forwarding a payload. Memory 606 may store scanner/processor 626, which includes instructions to perform at least some of the actions of process 500, such as scanning or otherwise processing a payload. Memory 606 may store one or more anti-virus components 636, which scan for malware signatures or use other heuristics to locate malware. Anti-virus components may be invoked by scanner/processor 626. Memory 606 may store a signature database 634 that includes malware signatures used when performing content inspection for malware or sensitive information.

Memory 606 may store a session setup protocol stack 628 or a secondary protocol stack 630. These stacks may be used to implement the session setup protocol (such as SIP), or the secondary protocol, such as TCP, respectively. In some configurations, any one or more of these components, or a portion thereof, may be implemented in hardware, software, or a combination thereof.

Memory 606 may include one or more server applications 632 that perform various functions of communication, security, acceleration, updating, management, or other functions. Microsoft Forefront® is a collection of applications that perform services such as these. One or more of the server applications 632 may manage or control operations of other components stored in memory 606.

Computing device 600 may include a video display adapter 612 that facilitates display of localized text strings to a user, or a speech component (not shown) that converts text to audio speech and presents the spoken strings to a user. Though not illustrated in FIG. 6, computing device 600 may include a basic input/output system (BIOS), and associated components. Computing device 600 may also include a network interface unit 610 for communicating with a network. Embodiments of computing device 600 may include one or more of a display monitor 614, keyboard, pointing device, audio component, microphone, voice recognition component, or other input/output mechanisms.

It will be understood that each block of the flowchart illustration of FIGS. 3-5, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. One or more computer-readable storage devices having stored thereon computer program instructions for intercepting and processing a payload sent from a sending client to a receiving client, the program instructions executable by one or more processors to perform actions including:
    a) receiving, at a first intermediate server, a session setup message sent between the sending client and the receiving client in a session setup protocol;
    b) determining whether the session setup message includes identifying information, inserted by a second intermediate server, indicating a server role corresponding to the second intermediate server; and
    c) at the first intermediate server, selectively inserting, into the session setup message, other identifying information indicating a server role corresponding to the first intermediate server, based on whether the session setup message includes the identifying information.

2. The one or more computer-readable storage devices of claim 1, the actions further including:
    a) receiving a subsequent notification message; and
    b) selectively performing payload intercept actions based on whether the subsequent notification message includes information identifying the server role corresponding to the first intermediate server as an intercepting server role.

3. The one or more computer-readable storage devices of claim 1, selectively inserting the other identifying information comprising selectively inserting the other identifying information into the session setup message, based on at least one of a configuration of the first intermediate server, or a load of the first intermediate server.

4. The one or more computer-readable storage devices of claim 1, selectively inserting the other identifying information comprising selectively inserting the other identifying information into the session setup message, based on whether the sending client is local or remote to the first intermediate server.

5. The one or more computer-readable storage devices of claim 1, selectively inserting the other identifying information comprising selectively inserting, the other identifying information into the session setup message, based on at least one of whether a session is to be encrypted, a type of encryption to be employed, or a protocol to be used for the session.

6. The one or more computer-readable storage devices of claim 1, the session setup protocol is Session Initiation Protocol (SIP), inserting the other identifying information comprising inserting the other identifying information in a header field of the session setup message.

7. The one or more computer-readable storage devices of claim 1, the actions further comprising not opting in to be a candidate for an intercepting server if an upstream server role has opted in to be the candidate.

8. A computer-based system for processing and forwarding a payload sent from a sending client to a receiving client in a secondary protocol, the system comprising:
    a) one or more intermediate servers that are topologically intermediate between the sending client and receiving client, each intermediate server having a corresponding server role that is different from a server role of a home server;
    b) each of the one or more intermediate servers configured to perform intermediate server actions including:
        i. receiving a session setup protocol message sent between the sending client and the receiving client;
        ii. inserting, in the session setup protocol message, information identifying the corresponding intermediate server role; and
        iii. in response to receiving a notification message from the home server, performing payload intercept actions including intercepting the payload sent in the secondary protocol and processing the payload.

9. The computer-based system of claim 8, the intermediate server actions further comprising selectively inserting, in the session setup protocol message, the information identifying the corresponding intermediate server role, based on at least one of a load of the intermediate server role or a capability of the intermediate server role.

10. The computer-based system of claim 8, the intermediate server actions further comprising selectively inserting, in the session setup protocol message, the information identifying the corresponding intermediate server role, based on whether another intermediate server has inserted, into the session setup protocol message, information identifying a server role corresponding to the other intermediate server.

11. The computer-based system of claim 8, the intermediate server actions further comprising selectively opting in to be a candidate for an intercepting server based on whether an upstream server role has opted in to be the candidate.

12. The computer-based system of claim 8, the intermediate server actions further comprising not opting in to be a candidate for an intercepting server if an upstream server role has opted in to be the candidate.

13. The computer-based system of claim 8, the intermediate server actions further comprising opting in to be a candidate for an intercepting server even though another server role has also opted in to be the candidate.

14. The computer-based system of claim 8, the intercepting the payload sent in the secondary protocol and processing the payload comprising intercepting a first portion of a message sent in the secondary protocol and processing the first portion of the message.

15. The computer-based system of claim 8, the intercepting the payload sent in the secondary protocol and processing the payload comprising:
    intercepting the payload sent in the secondary protocol;
    applying one or more first processing operations to the payload; and
    forwarding the payload to another intermediate server for further processing of the payload.

16. The computer-based system of claim 8, the intercepting the payload sent in the secondary protocol and processing the payload comprising:
    intercepting a payload that has been processed by another intermediate server; and
    applying one or more second processing operations to the payload.

17. A computer-based method of intercepting and processing a payload sent from a sending client to a receiving client, comprising:

a) receiving, at each of a plurality of intermediate servers, a session setup protocol message sent from the sending client to the receiving client, each intermediate server having a corresponding server role different from one or more other server roles corresponding to other intermediate servers;

b) determining, at each of the plurality of intermediate servers, whether to opt in to have a corresponding server role selected as an intercepting server role of a session between the sending client and the receiving client by including identifying information associated with the opting-in intermediate server at least one of in or with the session setup protocol message, based on whether one or more other servers of other server roles have opted in; and c) at each of the plurality of intermediate servers, selectively opting in based on a corresponding determination of whether to opt in.

18. The computer-based method of claim 17, further comprising at a server corresponding to at least one of the server roles, performing payload intercept actions in response to a selection of the at least one of the server roles as an intercept server role, the selection based on whether an intermediate server corresponding to the intercept server role opted in.

19. The computer-based method of claim 17, further comprising at each of the plurality of intermediate servers, selectively opting in based on a load of other servers of a same server role as the intermediate server.

20. The computer-based method of claim 17, further comprising selecting the intercepting server role to be a server role is topologically closest to the sending client from among the server roles that have opted in.

* * * * *